Feb. 18, 1958   W. L. GOLDSMITH   2,823,713
POWER KERFING SAW
Filed March 19, 1956

INVENTOR
WILLIAM L. GOLDSMITH
BY Gardner & Zimmerman
ATTORNEYS

United States Patent Office 2,823,713
Patented Feb. 18, 1958

2,823,713

POWER KERFING SAW

William L. Goldsmith, Redwood City, Calif.

Application March 19, 1956, Serial No. 572,373

10 Claims. (Cl. 144—136)

This invention relates to kerfing saws, and is more particularly directed towards the head construction of portable power kerfing saws.

As is well known in the art, kerfing saws are designed to cut a notch or channel in an article, and where such a notch is factory made at an unobstructed portion of the article, no particular difficulty is encountered. However, presently available portable kerfing saws arranged for on the job operation do not possess the accuracy of the larger stationary industrial units, and where the notch or channel is to be cut adjacent some obstructions, numerous problems arise including the danger of injury to the surface adjacent the cut, wide tolerance variations and the like.

By way of example, power kerfing saws of the portable type are particularly well adapted for the kerfing of a door or window jamb preparatory to the installation of weatherstripping in the notch or channel. The notch is desirably positioned adjacent the stop piece which extends outwardly from the jamb and with existing tools, the notch must either be spaced at too great a distance from the stop, or, if properly positioned, the surface of the stop or jamb is scratched or otherwise injured, and in any event, a great deal of difficulty is encountered in producing a notch of constant spacing from the stop.

Accordingly, it is an object of the present invention to provide a portable power kerfing saw which will accurately produce a channel or notch in a surface substantially immediately adjacent a wall member extending normal to such surface without injuring said surface or member.

Another object of this invention is to provide a tool of the character described in which means are provided for maintaining a rotary saw blade in a guarded position until ready for use, whereby the blade may be rotating as the tool is being properly positioned without danger of cutting until the operator desires to commence the kerfing operation.

A further object of the invention is to provide a saw of the above type in which means are provided for automatically returning the saw blade to its guarded or inoperative position when not in use.

Yet another object of this invention is to provide a portable power kerfing saw in which the depth of cut may be selectively and accurately controlled.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
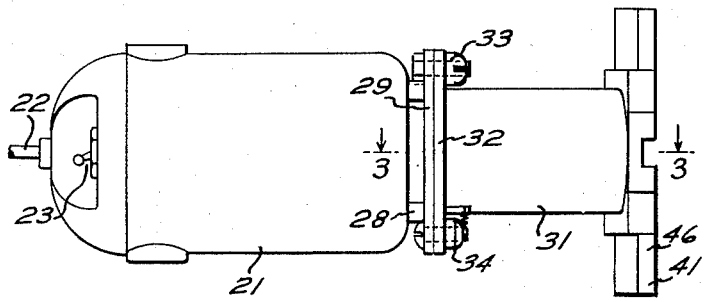
Figure 1 is a side elevational view of the kerfing saw of the present invention.
Figure 2:
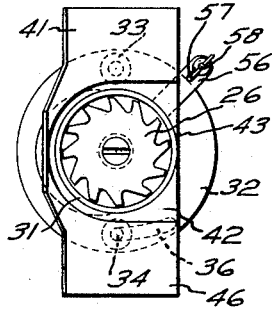
Figure 2 is an end view of the device as shown in Figure 1.

As hereinabove suggested, the kerfing saw of the present invention, while not limited to, is particularly well adapted for the cutting of a notch or channel 12 in the exposed surface 13 of a jamb 14 comprising a portion of a door frame or the like. More particularly, such notch 12 is provided for receiving weatherstripping (not shown) and accordingly, the notch is desirably positioned substantially immediately adjacent a wall 16 of a stop member 17 which is mounted on jamb surface 13 in the conventional manner.

In most instances, wheather stripping is installed after the jamb and strip 17 have been painted, and with presently available kerfing saws, the accuracy of the notch is materially affected by the skill of the operator, and in most instances, due to the manner of guiding the saw, surface 18 of strip 17, as well as other exposed portions of the strip or jamb, would become scratched and require refinishing.

In accordance with the present invention, my new kerfing saw eliminates the above difficulties and is capable of producing an accurate notch in less time than that previously required and without injuring any portions of the surrounding jamb structure.

Referring now to the drawing, the tool will be seen to include a conventional motor 21 having leads 22 for connection to a suitable source of current, a switch 23 being incorporated to selectively open and close the circuit. A drive shaft 24 extends axially forward of the motor, and a kerfing saw blade 26 is affixed to the distal end of the shaft in any suitable manner, such as by the machine screw 27 illustrated, whereby the general plane of the blade is at right angles to the axis of the shaft. Thus, upon motor energization, saw blade 26 will be rotated so that the peripheral teeth thereon may effect the cutting action.

Figure 5:
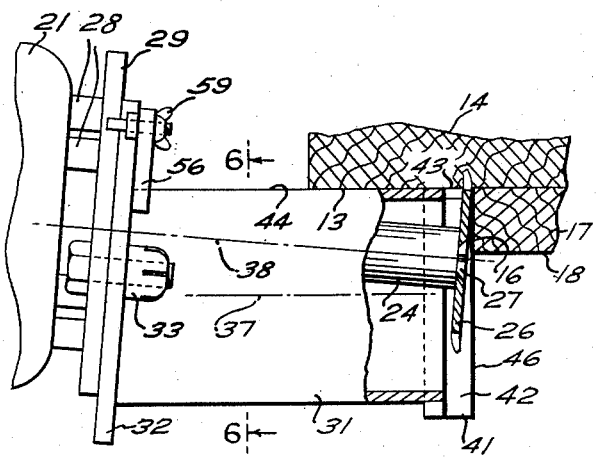
Figure 5 is a partly cross-sectional view similar to Figure 3, but showing the saw blade in operative position on the jamb.
Figure 6:
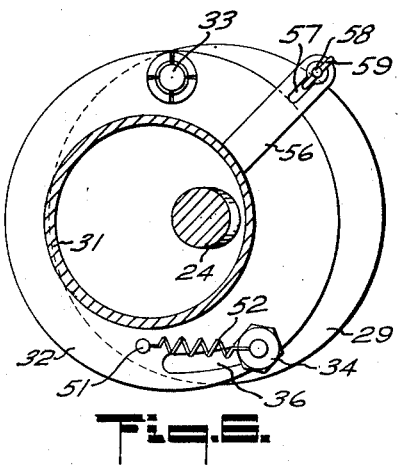
Figure 6 is a cross-sectional view taken substantially in the plane indicated by line 6—6 of Figure 5.

Secured to the front end of motor 21 such as by studs 28 is an annular base plate 29. Mounted on and extending forwardly of plate 29 is a generally cylindrical casing 31 whose rear end portion is provided with an annular flange 32 of substantially equal size to plate 29. Plate 29 and flange 32 are pivotally connected together by a bolt assembly 33 extending through the respective elements, and a second bolt or pin 34 is mounted on plate 29 in diametrically opposed relation to bolt 33 and is movable along an arcuate guide slot 36 provided in flange 32. In this manner, casing 31 may be moved from a first position as illustrated in Figure 3 wherein the casing axis 37 generally coincides with shaft axis 38 to a second position shown in Figure 5 wherein the respective axes are in spaced relationship.

As will be understood, casing 31 substantially encompasses the length of shaft 24, and the forward end of the casing is provided with a head member 41 generally rectangular in shape and of substantially the same width as the diameter of the casing. An outwardly opening recess 42 is provided in the head member for reception of saw blade 26 with the recess opening along one edge 43 of the head member, such edge being disposed at a right angle to a longitudinally extending peripheral surface 44 of the casing, such surface being circumferentially spaced 90° from the axes of the support members 33 and 34.

With the foregoing construction in mind, the method of operating the tool to produce the notch 12 in jamb 14 should be clear. With the tool in its normal or inoperative position as shown in Figure 3, the switch may be actuated, causing the shaft and saw blade 26 to rotate. However, in this position, the blade is disposed entirely within the lateral confines of casing 31. The operator may then position the tool on the jamb by engaging strip surface 16 with the flat end portion 46 of the head member which is normal to the casing and casing surface 44 with the jamb surface 13. It will be appreciated that this manner of supporting the tool renders the same very stable and in proper cutting position. Then, it is only necessary for the operator to rotate the motor relative to the casing thereby shifting shaft 24 into the position shown in Figure 5 and causing a peripheral portion of blade 26 to extend beyond edge 43 of the head member for cutting engagement with the jamb surface 13. The tool may then be readily moved along the entire length of the jamb in its aforesaid stable condition.

Figure 3:
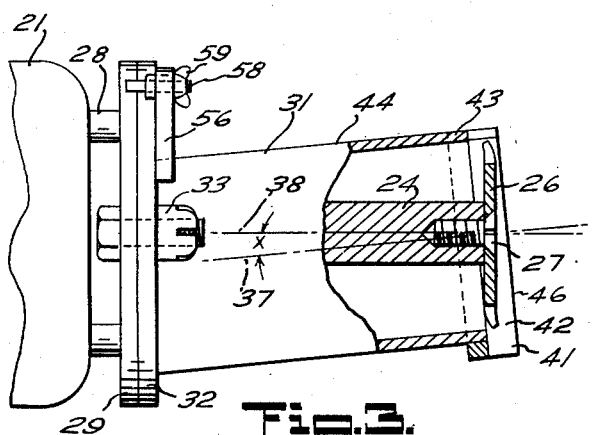
Figure 3 is a longitudinal partly cross-sectional view taken substantially in the plane indicated by line 3—3 of Figure 1, with the saw blade shown in its normal inoperative position.
Figure 4:
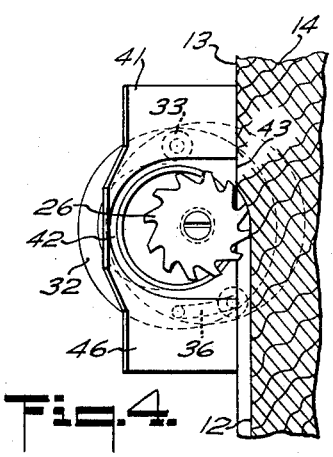
Figure 4 is an end view of the tool with the saw blade in its operative or cutting position, illustrated in use on a portion of a door jamb.

As an important feature of the invention it will be noted that while plate 29, flange 32 and blade 26 may all be disposed in parallel relationship and normal to shaft axis 38, the casing 31 is not normal to its flange 32 and its axis 37 defines with shaft axis 38 an included angle of approximately 3 degrees as indicated in Figure 3 by the letter x. Angle x preferably should be in the neighborhood of from 1 to 8 degrees, and it has been found that a 3 degree angle is extremely efficient.

The reason for this angular relationship is to permit the cutting of notch 12 immediately adjacent the surface 16 of the stop strip 17 without danger of the saw teeth engaging and injuring such surface. As is well known, the teeth of a conventional saw blade extend laterally beyond the generally planar surfaces of the blade, and if the blade was positioned normal to jamb surface 13 and parallel to strip surface 16, the teeth would scratch or cut the latter surface when the groove was being cut adjacent the same. However, by angularly positioning the saw blade 26 as shown, the general plane of the blade will form a small acute angle with surface 16 and effectively prevent the outer blade surface and the teeth thereon from engaging said surface. While it is true that such an arrangement will produce a notch that is likewise not absolutely perpendicular to jamb surface 13, no disadvantages result and the notch is still properly arranged to receive the weatherstripping.

Means are provided for resiliently maintaining the saw blade in the inoperative position illustrated in Figure 3 so that the operator may set the unit down without danger while the blade is still rotating. To accomplish this, a stud 51 may be provided in the forward surface of flange 32, with a spring 52 connecting the stud to the portion of bolt 34 extending through guide slot 36. Thus, upon release of the manually imparted rotating pressure to place the tool in cutting position, the spring 52 will effect a rotation of the casing back to its inoperative and safe position.

To selectively control the depth of cut, the amount of relative movement between shaft 24 and casing 31 must be likewise controlled. While this can be done in several ways, I have shown flange 32 provided with a radial arm 56 which is radially slotted as indicated at 57. A threaded pin 58 and wing nut 59 are relatively movable and securable at selected positions along the slot length with the end of the pin intercepting a peripheral portion of plate 29 so as to limit separation of plate 29 and flange 32.

What is claimed is:

1. A saw of the character described comprising a saw shaft adapted to support a saw blade at the distal end thereof, a casing substantially encompassing said shaft, and means permitting relative movement between said shaft and casing in a direction generally normal to the axes thereof.

2. In a tool of the type described, an annular base plate, a casing having a radially outward extending flange at one end thereof, means pivotally connecting said plate and flange for relative movement therebetween in the general planes thereof, and means adjacent the other end of said casing including a member having an outer end surface disposed generally normal to the axis of said casing and a saw blade receiving recess extending inwardly of said surface.

3. A power kerfing saw head comprising a generally cylindrical casing, a radially extending flange at one end of said casing, the axes of said casing and said flange defining an angle of from 1 to 8 degrees, the other end of said casing having an end surface normal to the axis of said casing, means on said end surface defining an axial recess extending from a peripheral surface of said casing, and means for supporting a saw shaft within said casing with a saw blade positioned in said recess, the axis of said saw shaft defining an acute angle with the axis of said casing and being substantially normal to said radially extending flange.

4. A power kerfing saw head comprising a generally cylindrical casing, a radially extending flange at one end of said casing, means on said flange adapted to operatively support a motor on the side thereof opposite said casing, the axes of said casing and said flange defining an acute angle therebetween, a radially enlarged head member having one edge portion thereof coterminous with the outer surface of said casing and an end surface disposed at right angles to the axis of said casing, and means on said head member defining a recess extending inwardly from said end surface and being open along said one edge portion for a distance at least equal to the diameter of said casing.

5. In a device of the character described, an annular base plate, a casing, a radial flange of substantially the same diameter as said plate extending from one end of said casing and positioned against a surface of said plate, pivot means extending axially through said plate and flange for relative planar movement of said plate and flange, and means defining an arcuate slot and a pin extending therethrough in diametrically opposed relation to said pivot.

6. A device as set forth in claim 5 in which the axis of said casing defines an included angle of less than 90 degrees with the plane of said flange.

7. A portable rotary saw head attachment comprising a generally cylindrical casing having a radial mounting flange adjacent one end thereof with the axis of said flange being angularly related to the axis of said casing, a head member mounted on the other end of said casing and having a flat end surface disposed substantially normal to the axes of said casing, said member having an edge disposed generally normal to the plane of said surface and being substantially tangent to the periphery of said casing, and means defining a recess in said member opening along said edge and said surface.

8. A portable power kerfing saw head comprising an annular base plate adapted to be mounted on a power source, a second annular plate positioned in abutting relation to said base plate, means pivotally mounting said plates about an axis normal to the planes thereof, means limiting pivotal movement of said plates, a casing extending from said second plate, and means normally urging said second plate into a position generally aligned with said base plate.

9. Apparatus as set forth in claim 8 in which means are provided for selectively limiting the amount of pivotal movement of said plates.

10. Apparatus as set forth in claim 8 in which the axes of said plates defines an included angle of less than 90 degrees with an axially extending peripheral edge portion of said casing.

References Cited in the file of this patent

UNITED STATES PATENTS

| | | |
|---|---|---|
| 1,780,174 | Crowe | Nov. 4, 1930 |
| 1,848,330 | Emmons | Mar. 8, 1932 |
| 2,566,778 | Skinner | Sept. 4, 1951 |
| 2,587,994 | Gregory | Mar. 4, 1952 |
| 2,630,151 | Turnbull | Mar. 3, 1953 |
| 2,705,513 | Moeller | Apr. 5, 1955 |
| 2,741,282 | Wieting | Apr. 10, 1956 |

FOREIGN PATENTS

| | | |
|---|---|---|
| 125,337 | Great Britain | Apr. 17, 1919 |